United States Patent [19]
Bishop

[11] 3,922,673
[45] Nov. 25, 1975

[54] IFF INTERROGATOR IDENTIFICATION SYSTEM

[75] Inventor: Walton B. Bishop, Washington, D.C.

[73] Assignee: The United States of America as represented by the Secretary of the Navy, Washington, D.C.

[22] Filed: May 31, 1974

[21] Appl. No.: 474,992

[52] U.S. Cl. .......................................... 343/6.5 LC
[51] Int. Cl.² .......................................... G01S 9/56
[58] Field of Search .............................. 343/6.5 LC

[56] References Cited
UNITED STATES PATENTS
3,359,554  12/1967  Hoffmann-Heyden ........ 343/6.5 LC

*Primary Examiner*—T. H. Tubbesing
*Attorney, Agent, or Firm*—R. S. Sciascia; Arthur L. Branning; Norman V. Brown

[57] ABSTRACT

An IFF system with the capability of determining the identity of the interrogator and of conditioning the reply based upon the identity code of the interrogator. Identity of the interrogator contained in a received interrogation signal is determined by logic devices in order to determine presence of pulses in predetermined positions of the signal.

7 Claims, 7 Drawing Figures

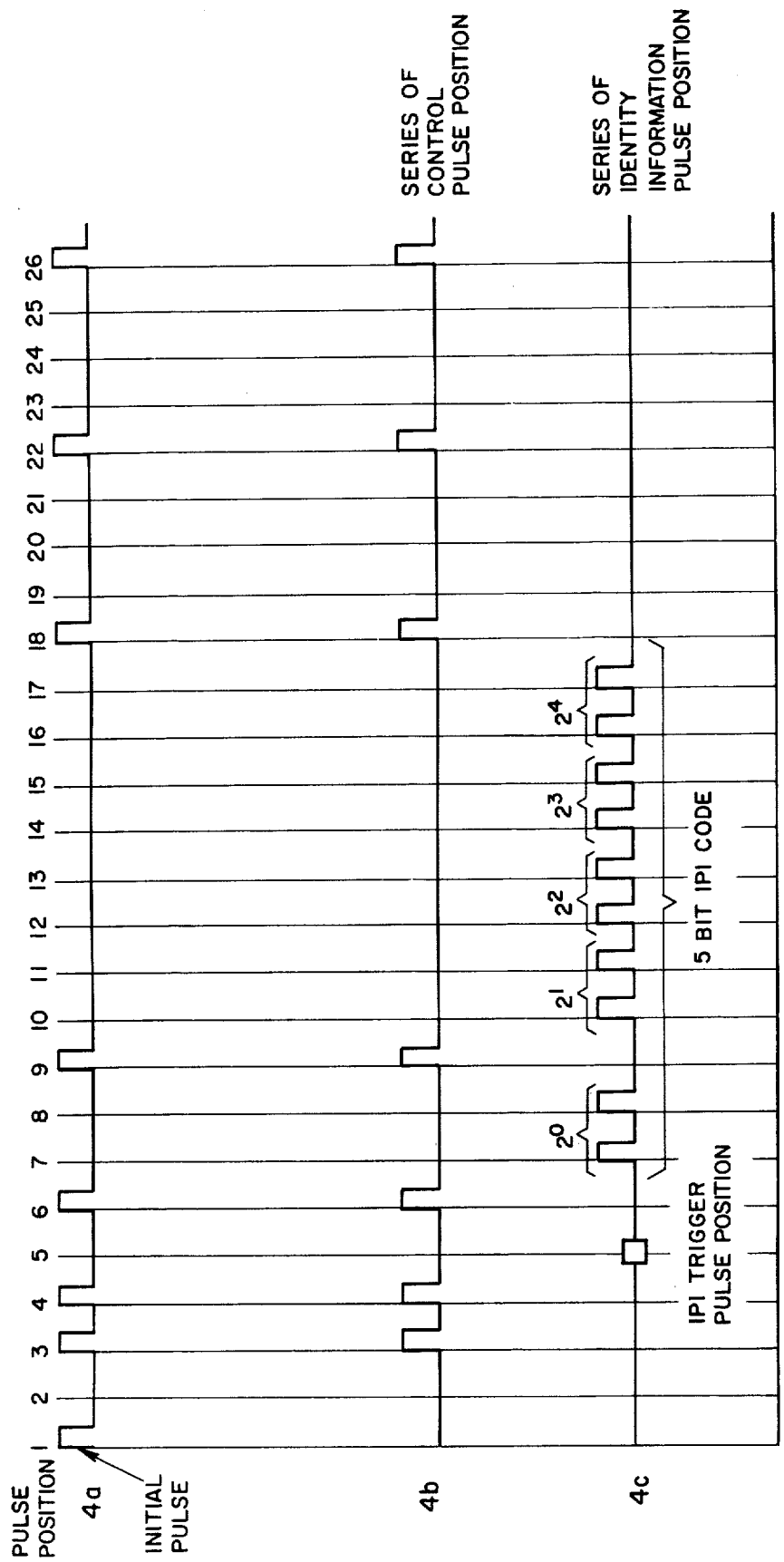

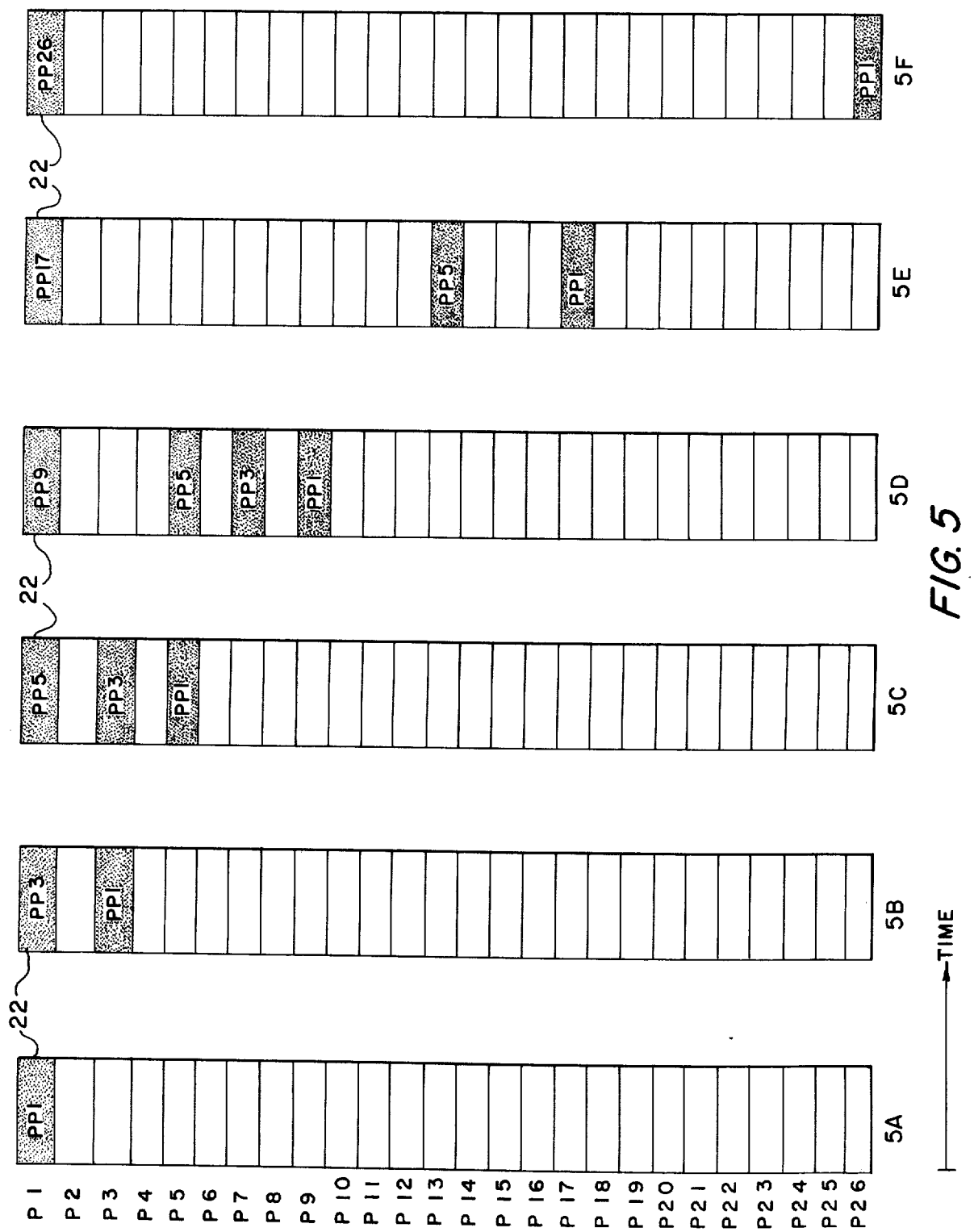

1

IFF INTERROGATOR IDENTIFICATION SYSTEM

BACKGROUND OF THE INVENTION

The present invention relates to identification techniques to determine the identity of the interrogating station for use in conjunction with Identification-Friend-or-Foe (IFF) and Air Traffic Control type interrogation systems.

IFF and similar transponder systems have traditionally been used to allow a transponder in an airplane to automatically respond in a particular way to a special signal from a ground station or another aircraft. Information transmitted by the transponder in response to the interrogation can be of tremendous importance to an aircraft controller who must know, for example, the identity and altitude of the aircraft he is monitoring and directing. Similarly, information of this nature is vitally important to a military aircraft-intercept station desirous of knowing whether the approaching aircraft is friend or foe. IFF systems serve this need.

An interrogation transmitter system, when transmitting an interrogation-request, transmits a coded signal or message consisting of a train of pulses spaced along in time. This coded signal is received by the IFF transponder and analyzed. If the pulses are of the correct predetermined frequency, amplitude and spacing, a reply signal will be produced by the transponder. The interrogation system may be positioned on the ground or in an aircraft; while the transponder may be mounted, for example, in a ground vehicle or airplane, and be utilized for transimtting its identity or other pertinent information such as altitude or position.

Often situations arise in which the one being interrogated receives interrogation requests from more than one interrogator. In many of these situations it is important that the requests be replied to in a particular order or that some requests not be answered at all, depending upon the identity of the interrogator. For example, air traffic control replies should generally be limited to nearby interrogators. In a military environment a correct reply should perhaps only be given to a "friend" and not to a "foe," a reply should be given to defensive-intercept stations in order to deactivate attack missiles aimed at the interrogated aircraft before requests from more routine stations are answered.

Present day IFF systems do not allow this selective response which enables replies to be made to only particular interrogators, or in a particular order based on the identities of the interrogators. This is because present IFF systems do not provide for the interrogator's giving his identity along with his interrogation-request. Consequently, a means of enabling an IFF system to make known the identity of the interrogating station is urgently needed.

The present invention provides an important solution to this long felt problem of "who wants to know." It does so not only in a way that is both relatively efficient and inexpensive, but that is completely compatable with present IFF systems as well.

SUMMARY OF THE INVENTION

The present invention provides IFF type systems with the capability of determining the identity of the interrogator and of conditioning the reply based upon the identity-code of the interrogator.

The received interrogation-request signal is examined to determine whether information regarding the identity of the interrogator is contained in the signal and, if so, what the identity of the interrogator is. This is accomplished by processing the received signal in a storage device while examining it by logic circuitry for the specific information content in terms of pulses in predetermined positions of the signal. An identity trigger-pulse in a predetermined position of the interrogation signal indicates presence of interrogator identity-code information in the signal. Upon detection of this trigger-pulse, signal pulse positions carrying the identity-code are examined and decoded to ascertain the interrogator's identity. Logic circuitry provides control signals related to the identity-code information thereby enabling a response appropriate to the received identity-related information-code to be made.

OBJECTS OF THE INVENTION

It is an object of the present invention to generate control signals in response to interrogator-identity information contained in an interrogation signal, whereby the control signals may be used to condition the interrogation reply.

It is another object of this invention to readily determine whether information relating to the identity of the interrogator is present or not.

It is a further object of the present invention to readily determine the indentity of the interrogation from information contained in the interrogation signal, when the signal contains this information.

Other objects, advantages and novel features of the invention will become apparent from the following detailed description of the invention when considered in conjunction with the accompanying drawings wherein:

BRIEF DESCRIPTION OF THE DRAWINGS

FIG. 4a shows a typical conventional digital interrogation message.

FIG. 4b shows the pulse-positions of a conventional digital interrogation message which are utilized to convey information related to commands for a particular response (e.g. modes) by the transponder. FIG. 4c shows the pulse-positions of a digital interrogation message which are utilized to convey information related to the identity of the interrogator.

FIG. 5 depicts the contents at various instants of time of a shift-register delay means of the preferred embodiment utilized in processing the received interrogation signal.

DESCRIPTION OF THE PREFERRED EMBODIMENT

Figure 1:
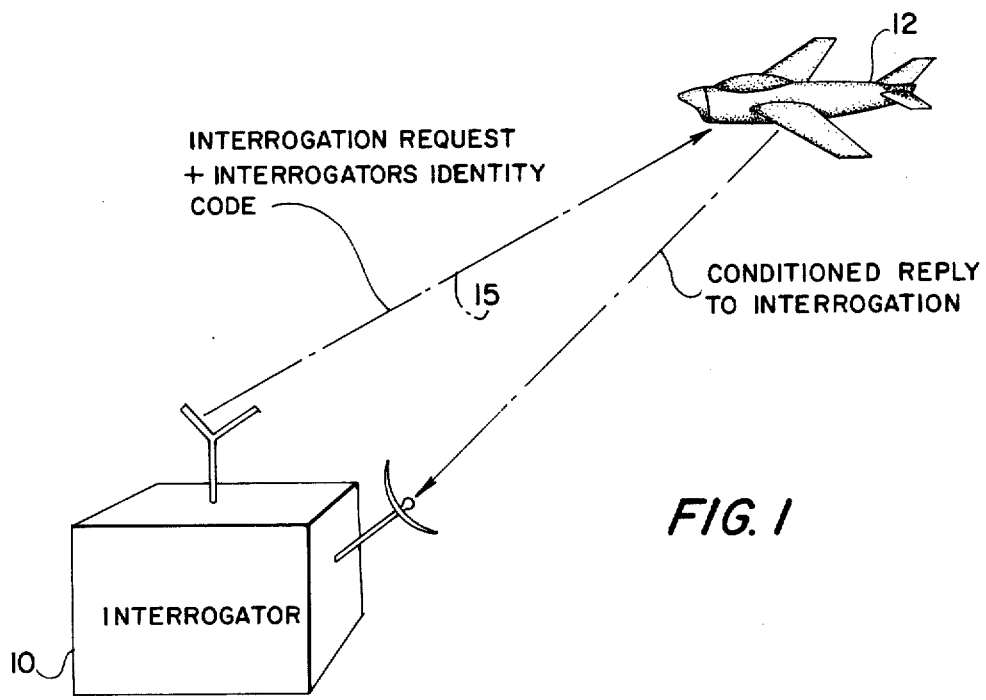
FIG. 1 is a pictorial representation indicating the function of the present invention.

FIG. 1 illustrates in a pictorial way a typical transmitted interrogation signal and transponder reply-signal path and equipment locations. The transponder 12 receives an interrogation signal 15 from an interrogation station 10.

The pulse-position structure of a conventional interrogation-signal message (in this instance that used by the military Identification-Friend-or-Foe (IFF) system and the civilian Air Traffic Control Radar Beacon System (ATCRBS) is shown in FIG. 4a. The present invention makes advantageous use of various unused signal pulse-positions (shown as unoccupied pulse positions in FIG. 4a) of these conventional systems by selecting several or all unused pulse-positions for carrying the identity-code and identity trigger-signal.

Some very simple identity-code formats in conjunction with the present invention could be used by IFF-/ATCRBS or similar systems to allow interrogator stations to identify themselves as appropriate stations to receive response priorities. It should be noted that the identity-coding arrangement of the present invention could easily be used for sending any type of digital message from an interrogator to a transponder. It might, for example, provide information concerning the direction in which an interrogator is transmitting, or what particular information was desired.

Figure 2:
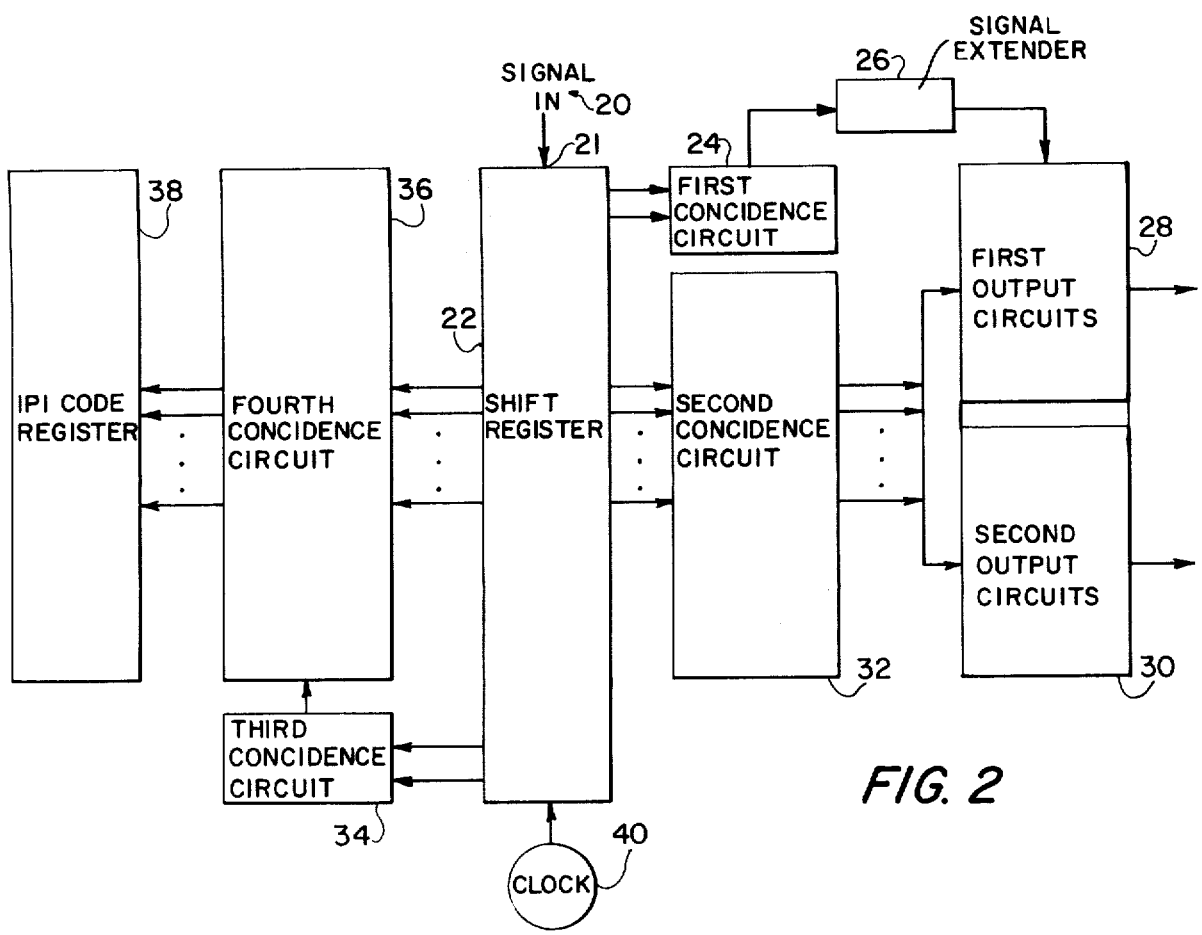
FIG. 2 is an overall functional block diagram of an IFF-identity determining responsive system.

An incoming interrogation signal is processed by equipment of the present invention as illustrated in the functional block diagram of FIG. 2. The interrogation signal 20 is received into input 21 of a delay means such as a shift register 22. The shift register 22 is connected to a first coincidence means 24, which in turn is connected through signal extender means 26 to a first output means 28 and a second output means 30.

Signal extender means 26 may comprise a monostable switch which produces a gated output voltage upon receipt of an input signal.

First output means 28 and second output means 30 are connected to the shift register 22 through a second coincidence means 32. In a similar fashion, a third coincidence means 34 is connected between the shift rigister 22 and a fourth coincidence means 36 which in turn is connected to an identity-code register 38. Code register 38 may be comprised of a series of flip-flop circuits. A clock means 40 is also connected to the shift register 22.

Figure 3:
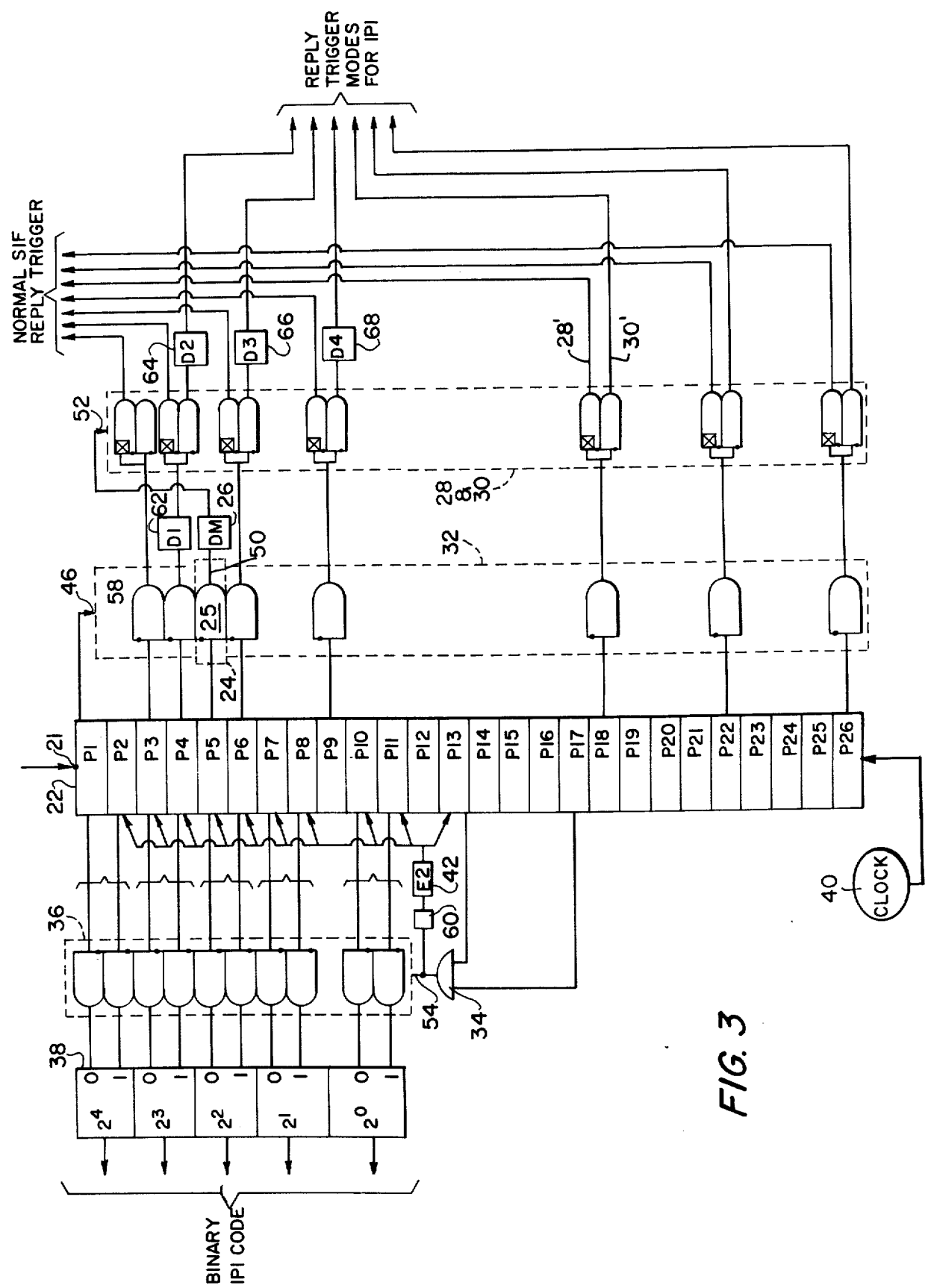
FIG. 3 is a schematic diagram of an embodiment of the present invention.

Referring now to FIG. 3, shift register 22 is so constructed that each digital position of the signal stored in the register is available for examination to determine the presence or absence of a pulse. The shift register 22 is composed of a series of "bins" that store a pulse in binary fashion, representing the presence or absence, respectively, of a pulse in a given pulse-position of the received interrogation signal by a 1 or 0, respectively. These "bin" positions are sequentially numbered 1 through 26 in the preferred embodiment.

All coincidence means 24, 32, 34 and 36, as well as both output means 28 and 30, of the preferred embodiment are comprised of one, or several AND gates, each having two input terminals and an output terminal. One of the input terminals is called a "common input terminal." Connections to the common input terminal of each AND gate are symbolized by a small circle or dot on the AND gate symbol. These common input terminals are connected to the signal lead shown connected to the dashed line surrounding a series of AND gates.

The first coincidence means 24 is composed of only one AND gate 25. This gate has it's common input terminal connected to bin position 1 of shift register 22. The other input terminal of AND gate 25 is connected to shift register 22 bin position 5. The output terminal 50 of AND gate 25 is connected through signal extender means 26 to the common input terminal of each AND gate of first and second output means 28 and 30.

The second coincidence means 32 is comprised of a series of AND gates, one for each different command-pulse position (FIG. 4b). These correspond to pulse positions 3, 4, 6, 9, 18, 22 and 26 of the interrogation signal in the IFF/ATCRBS systems. Each AND gate of the second coincidence means 32 has its common input terminal connected to shift register 22 pin position 1, and its other input terminal connected to a bin position corresponding to a command-pulse position. Thus, the other input terminals of the AND gates of the second coincidence means are respectively connected to bin positions 3, 4, 6, 9, 18, 22 and 26 of shift registor 22. The outputs of these AND gates are respectively connected to inputs of corresponding pairs of AND gates which are a part of the first and second output means 28 and 30, respectively.

First output means 28 and second output means 30 are each comprised of a series of AND gates. Each of these AND gates has its common input terminal connected to the output of signal extender means 26. The AND gates of first output means 28 each have their non-common input terminal acting to inhibit its gate upon receipt of a signal (this input is shown indicated with an $x$ in the AND symbol in FIG. 3).

The non-common input terminals of each of the AND gates of the second output means 30 are respectively connected to corresponding outputs of the AND gates of second coincidence means 32.

The outputs of the AND gates forming the first output means 28 form a first set of output signals 28' which correspond to an absence of the identity-code trigger pulse, while the outputs of the AND gates of the second output means 30 form a second set of output signals 30' corresponding to the presence of the identity-code trigger-pulse.

The third coincidence means 34 is comprised of only one AND gate whose inputs are connected to bin positions 13 and 17 of shift register 22. The output of this AND circuit is connected to the common input terminal of each AND gate comprising the fourth coincidence means 36, and is also connected through delay means 60 to an erase means 42. Positions P2 through P13 of shift register 22, with exception of P9 and P12, are connected to erasing means 42.

The fourth coincidence means 36, is comprised of a series of AND gates, equal in number to the number of information-pulse positions of the interrogation signal to be examined. Shift register 22 bin positions 1 through 11, excluding 9, correspond to these positions. Thus, for the preferred embodiment, ten AND gates are utilized for fourth coincidence means 36. Each of these AND gates has its common input terminal connected to the output of third coincidence means 34. The non-common input terminals of the AND gates are respectively connected to bin positions 1 through 11, excluding 9, of shift register 22. The outputs of the AND gates of fourth coincidence means 36 are connected to an identity-code register 38 which combines the output signals from the AND gates to produce a binary output representative of the identity-code contained in the interrogation signal applied to shift register 22.

In operation the received interrogation signal is fed in a stepwise serial fashion into shift register 22 through its input 21. This register contains a series of "bins" which are each capable of storing a pulse whose presence or absence may be noted as 1 to 0. Thus, the presence of a pulse can be coded as a 1 while its absence as a 0. Also, by application of a clock pulse, from clock 40, whatever is in one bin can be made to shift into the next adjoining bin in sequence. Thus, the pulse information in the bins of the shift register 22 will shift at the clock specified interval or rate. For example, if an interrogation signal received is 26 microseconds long and the clock 40 is set to produce a "change pulse" every microsecond, then as time goes on the leading edge of the signal will be shifted along from the first to the twenty-sixth bin position in the shift register. During the first microsecond (after signal receipt into the shift register) the contents of the register will appear as in FIG. 5a, with the first pulse position of the signal in the first bin or shift register 22. During the third microsecond, the first pulse will have shifted to the third bin position and signal pulse position 3 will have been received into the first bin or shift register 22 as shown in FIG. 5b. During the fifth microsecond, signal pulse positions 1 through 5 of the incoming signal will appear in bin positions 5 through 1, respectively, as indicated in FIG. 5c. Positions in the shift register occupied by signal pulse positions during the 17th microsecond are shown in FIG. 5e, while those for the 26th microsecond are shown in FIG. 5f.

When used in conjunction with the first through fourth coincidence means 24, 32, 34 and 36, shift register 22 forms a kind of measuring stick by which it can be determined exactly what, if any, command, trigger, or identity-code pulses exist in the pre-arranged pulse positions. For example, during the fifth microsecond the leading pulse is present in bin 5 (corresponding to the first pulse of the signal) and a control pulse may be present in bin 1 (corresponding to the fifth pulse position of the signal). This joint occurrence is sensed by AND gate 25, which comprises the first coincidence means 24. Sensing is accomplished when its two inputs, one connected to shift register 22 bin 1 and the other to bin 5, each receive a 1 indicating a pulse is present in each bin. An output signal is then produced by AND gate 25, which is then passed through signal extender means 26 to the common input terminals of the AND gate pairs comprising first and second output means 28 and 30. The presence of a pulse (identity-code trigger-pulse) in the fifth pulse-position is used to indicate the presence of identity-code information present in the signal at the identity-code pulse positions as indicated in FIG. 4c. First coincidence means 24 detects this trigger-pulse and supplies an output signal to signal extender means 26 upon the detection. Signal extender means 26 in turn supplies an input signal to the common input terminal of each AND gate of first and second output means 28 and 30. Signal extender means 26 serves to keep this input signal present after the trigger-pulse has passed to another bin in the shift register 22. Thus, the input signal is maintained until the entire interrogation message has been received and the control pulse positions of the signal examined (i.e. a delay of 21 microseconds in this preferred embodiment).

First and second output means 28 and 30 act in a manner complementary to each other. First output means 28 can produce an output only if the trigger-pulse is not present, while second ouput means 30 can produce an output only when the trigger-pulse is present. the output from the trigger-pulse sensing function of first coincidence means 24 is received by the common input terminals of the AND gates of both first and second output means 28 and 30. Since the common input terminals of the AND gates of first output means 28 are inhibit terminals, receipt of a signal from AND gate 25, indicating a "signal trigger-pulse present," acts to inhibit these AND gates, while the absence of the signal trigger-pulse acts to enable the AND gates of the first output means, thus allowing it to produce an output signal if the other terminals of its AND gates receive a signal pulse. Conversely, receipt of a signal from AND gate 25 allows the AND gates of second output means 30 to produce an output signal if the other terminals of its AND gates receive a signal. Delay means 62, 64, 66, and 68, connected to the output of the AND gates of the second output means 30, and delay means 62 act to maintain an associated output signal from the second output means 30 until the entire interrogation message has been received into shift register 22 and examined.

Third coincidence means 34 is utilized to determine that all identity-code bins have been received into shift register 22, and to activate the identity-code read and decode function only if an identity-trigger pulse is present in the interrogation message as described above. Since the identity-code has been chosen to be located in a signal pulse position between and including the seventh through seventeenth (excluding the ninth), then it can be seen from FIG. 5e that when the initial pulse has progressed through the shift register 22 to the seventeenth bin, (at 17 microseconds from entry of the first pulse of the signal) then the identity-trigger pulse in signal pulse-position 5 is present in bin position 13. Since the two inputs to the AND gate that comprise the third coincidence means 34 are connected to these bin positions, an output signal occurs upon the joint occurrence of the initial signal-pulse, present in bin position 17, and the signal trigger-pulse, present in bin position 13. The output of AND gate 34 performs two functions. First, it supplies what is in effect an enabling signal to fourth coincidence means 36 by way of the common input terminals of the AND gates comprising it. The enabling signal causes these AND gates to "read" the information position of shift register 22 (corresponding to the identity-code information pulse-portions of the signal) into identity-code register 38.

"Reading out" of information positions in shift register 22 (corresponding to the identity-code information pulse positions of the signal) is accomplished by the AND gates that comprise fourth coincidence means 36. Each AND gate produces an output signal (when enabled) if a pulse is present in the respective bin of shift register 22 to which it is connected. Thus, when a signal trigger-pulse is present in bin position 13, the enabling signal is received by each AND, closing each gate and allowing the 1's or 0's stored in the respective bins to be transmitted by each respective AND gate to its corresponding portion of the identity-code register 38 input.

The flip-flop circuits of the identity-code register 38 are "set" to either 1 or 0 by signals transmitted from the AND gates of the fourth coincidence means 36. The output signals from the flip-flops then indicate the identity-code received.

The second function that the output from the third coincidence means performs is to actuate a delay means 60 associated with erase means 42. "Erasure" of information positions in shift register 22 is effectuated by erase means 42 connected to those information positions, and occurs at a predetermined time (e.g. microseconds) determined by delay means 60 after the fourth coincidence means 36 has received the enable signal from AND gate 34 of the third coincidence means 34.

It should be noted that although the present invention may be implemented in numerous ways, the particular embodiment disclosed above is not the simplest manner of device possible to accomplish the objects of the invention. The particular embodiment described is particularly constructed to be compatable with existing IFF-type systems presently in use, and therein lies the reason for additional complexity.

Obviously many modifications and variations of the present invention are possible in light of the above teachings. It is therefore to be understood that within the scope of the appended claims the invention may be practiced otherwise than as specifically described.

What is claimed and desired to be secured by letters patent of the united states is:

1. In a transponder having a shift register for receiving an interrogation signal and means for detecting the presence of mode-command pulses in said signal, the improvement comprising:
   first coincidence means connected to said shift register for detecting the presence of an identity-code trigger pulse in said interrogation signal and for producing a first signal upon occurence of said detection;
   output means connected to said first coincidence means responsive to said first signal whereby an output signal will be present only upon occurence of said first signal;
   second coincidence means connected to said shift register for detecting the presence of identity-code pulses in said interrogation signal and for producing output signals corresponding to the presence of said detected pulses.

2. In a transponder for receiving an IFF interrogation signal transmitting a reply signal, said interrogation signal comprising pulses which, if present, occur in any of equally spaced pulse positions, said pulse positions constituting an initial pulse position, an identity-code trigger-pulse position, and a series of identity-code pulse positions, the addition of:
   an identity determining response network for determining the identity of the interrogating source when said source is transmitting said identity, and for providing signals indicating the presence or absence of such identity-code, said identity determining response network comprising:
   delay means for sequentially storing said interrogation signal;
   first coincidence means connected to said delay means for detecting the presence in said delay means of said initial pulse and said identity-code trigger pulse and for producing a first signal upon occurrence of said detection; and,
   second coincidence means connected to said delay means for detecting the presence of any of said identity-code pulses and for producing output signals corresponding to each of last said detected pulses connected to said delay means.

3. In a transponder for receiving an IFF interrogation signal and for transmitting a reply signal, said interrogation signal comprising pulses which if present occur in any of equally spaced pulse positions, said pulse positions constituting an initial pulse position, an identity-code trigger pulse position, and a series of identity-code pulse positions, the addition of:
   an identity determining response network for determining the identity of the interrogating source when said source is transmitting said identity, and for providing signals indicating the presence or absence of such identity-code, said identity determining response network comprising;
   delay means for sequentially storing said interrogation signal;
   first coincidence means connected to said delay means for detecting the presence in said delay means of said initial pulse and said identity-code trigger pulse and for producing a first signal upon occurrence of said detection;
   first timing means connected to said first coincidence means for producing a timed signal upon occurrence of said first signal, said timed signal having a duration equal to the time necessary for said delay means to receive the entire interrogation signal;
   second coincidence means connected to said delay means for detecting the presence in said delay means of any of said command pulses and for producing second signal corresponding to each detected command pulse;
   first output means connected to said second coincidence means and to said first timing means for producing first output signals corresponding to the joint occurrence of said second signals and said timed signal;
   second output means connected to said second coincidence means and to said first timing means for producing second output signals corresponding to the occurrence of said second signals and to the non-occurrence of said timed signal;
   third coincidence means connected to said delay means for producing a third signal upon determining that only said initial pulse and all said identity-code pulse positions of said interrogation signal have been received into said delay means, and that said initial first and said trigger pulses are present; and
   fourth coincidence means connected to said delay means and to said third coincidence means for detecting the presence of any of said identity-code pulses, and for producing output signals corresponding to each of last said detected pulses.

4. The transponder of claim 3 wherein said coincidence means and said output means are comprised of AND gates.

5. The transponder of claim 3 wherein said delay means is a shift register.

6. The transponder of claim 5 wherein said first coincidence means is connected to the first and fifth bins of said shift register and wherein said trigger pulse occurs in the fifth pulse position.

7. The transponder of claim 5 wherein said third coincidence means is connected to the first eleven bins excluding the ninth bin, of said shift register and wherein all identity-code pulse positions are contained within the first sixteen pulses of said interrogation signal.

* * * * *